(12) United States Patent
Park et al.

(10) Patent No.: US 9,645,168 B2
(45) Date of Patent: May 9, 2017

(54) HEAD LIMITING MOVEMENT RANGE OF LASER SPOT AND ATOMIC FORCE MICROSCOPE HAVING THE SAME

(71) Applicant: Park Systems Corp., Suwon-si, Gyeonggi-do (KR)

(72) Inventors: Sang-il Park, Seongnam-si (KR); Dongryul Kim, Gwangmyeong-si (KR); Byoung Woon Ahn, Anyang-si (KR); Sang Han Chung, Seoul (KR)

(73) Assignee: PARK SYSTEMS CORP., Suwon-Si, Gyeonggi-Do (KR)

( * ) Notice: Subject to any disclaimer, the term of this patent is extended or adjusted under 35 U.S.C. 154(b) by 0 days.

(21) Appl. No.: 14/757,519

(22) Filed: Dec. 23, 2015

(65) Prior Publication Data

US 2016/0187373 A1    Jun. 30, 2016

(30) Foreign Application Priority Data

Dec. 24, 2014 (KR) .................. 10-2014-0188493

(51) Int. Cl.
*G01Q 20/02* (2010.01)
*B82Y 35/00* (2011.01)

(52) U.S. Cl.
CPC ............. *G01Q 20/02* (2013.01); *B82Y 35/00* (2013.01)

(58) Field of Classification Search
None
See application file for complete search history.

(56) References Cited

U.S. PATENT DOCUMENTS

| | | | | |
|---|---|---|---|---|
| 5,157,251 A * | 10/1992 | Albrecht | ................ | B82Y 35/00 250/216 |
| 6,677,567 B2 * | 1/2004 | Hong | ................ | B82Y 35/00 250/201.3 |
| 7,478,552 B2 * | 1/2009 | Gotthard | ................ | B82Y 35/00 73/105 |
| 8,321,960 B2 * | 11/2012 | Ito | ................ | B82Y 35/00 850/1 |

* cited by examiner

*Primary Examiner* — Jack Berman
(74) *Attorney, Agent, or Firm* — Hauptman Ham, LLP

(57) ABSTRACT

Provided are a head having improved usability by limiting a movement range of a laser spot and an atomic force microscope having the same.
A head according to an exemplary embodiment of the present disclosure is a head measuring bending of a cantilever by using a laser beam reflected on the surface of the cantilever in order to acquire information on a sample surface by using a tip of the cantilever. The head includes: a spot moving means configured to move a laser spot so as to position the laser spot on the surface of the cantilever; and a movement limiting means configured to limit a movement range of the laser spot moved by the spot moving means in a predetermined range.

10 Claims, 4 Drawing Sheets

HEAD LIMITING MOVEMENT RANGE OF LASER SPOT AND ATOMIC FORCE MICROSCOPE HAVING THE SAME

CROSS-REFERENCE TO RELATED APPLICATIONS

This application claims the priority of Korean Patent Application No. 10-2014-0188493 filed on Dec. 24, 2014, in the Korean Intellectual Property Office, the disclosure of which is incorporated herein by reference.

BACKGROUND

Field

The present disclosure relates to a head and an atomic force microscope having the same, and more particularly, to a head having improved usability by limiting a movement range of a laser spot and an atomic force microscope having the same.

Description of the Related Art

A scanning probe microscope (SPM) represents a microscope that measures a surface characteristic of a sample and shows the measured surface characteristic as a 3D image while making a minute probe manufactured through an MEMS process scan the surface of the sample. The scanning probe microscope may be subdivided into an atomic force microscope (AFM), a scanning tunneling microscope (STM), and the like according to a measurement method.

FIG. 1 is a schematic perspective view of an atomic force microscope in which an XY scanner and a Z scanner in the related art and FIG. 2 is a schematic conceptual diagram of a head used in the atomic force microscope having a structure of FIG. 1.

Referring to FIG. 1, the atomic force microscope 10 is configured to include a cantilever 2 following the surface of a measurement target 1 in a contact or non-contact state, an XY scanner 11 scanning the measurement object in X and Y directions on an XY plane, a Z scanner 21 connected with the cantilever 2 to move the cantilever 2 in a Z direction with a comparatively small displacement, a Z stage 12 moving the cantilever 2 and the Z scanner 21 in the Z direction with a relatively large displacement, and a fixing frame 13 fixing the XY scanner 11 and the Z scanner 12.

The atomic force microscope 10 acquires an image such as topography, or the like by scanning the surface of the measurement object 1 with the cantilever 2. Relative movement of the surface of the measurement object 1 and the cantilever 2 may be performed by the XY scanner 11 and the cantilever 2 may be vertically moved by the Z scanner 21 so as to follow the surface of the measurement object 1.

Meanwhile, the cantilever 2 and the Z scanner 21 are connected by a probe arm 22 and a head 20 including the probe arm 22 and the Z scanner 21 is not explicitly illustrated in FIG. 1.

Referring to FIG. 2, the head 20 is configured to serve to measure a motion (for example, a bending degree) of the cantilever 2 by using a laser system and provide the measurement motion to a controller (not illustrated).

The head 20 has a laser beam generating unit 23 irradiating a laser beam and the laser beam generating unit 23 irradiates the laser beam to a mirror 24 fixed to an intermediate body 28. The laser beam is directly reflected by the mirror 24 and thereafter, passes through a hole formed in the intermediate body 28 to be reflected on the top surface of the cantilever 2 again. The reflected laser beam is again reflected by a steering mirror 25 to focus on a beam detecting device 26. Herein, as the beam detecting device 26, a position sensitive photo detector (PSPD) is primary used and the laser spot is positioned at the center of the PSPD, and as a result, measurement preparation is completed. The Z scanner 21 is controlled based on a signal detected by the beam detecting device 26. The beam detecting device 26 may be installed to be fixed to a housing 30 of the head 29 and a detailed layout relationship is omitted for easy description.

In order to position the laser spot at the center of the beam detecting device 26, first, focusing the laser spot on the top surface of the cantilever 2 needs to be preceded. A user manually adjusts the laser spot to be positioned on the top surface of the cantilever 2 by operating control knobs 27A and 27B as a spot moving means while visually verifying whether the laser spot is positioned on the top surface of the cantilever 2 by using a vision system (not illustrated) which may view the top of the cantilever 2. Control knobs 27A and 27B changes a slope of the intermediate body 28 supporting the mirror 24 to change a path of the laser beam. For example, the control knob 27A may cause movement of the laser spot in a width direction of the cantilever 2 and the control knob 27B may cause movement of the laser spot in a longitudinal direction of the cantilever 2.

A location area (hereinafter, referred to as 'spot area') of the laser spot which is adjustable by the control knobs 27A and 27B is widely designed by reflecting an assembly tolerance, and the like in order to accommodate cantilevers 2 having various sizes.

However, the widely designed spot area brings about inconvenience for use. The user focuses the laser spot on the top surface of the cantilever 2 by adjusting the control knobs 27A and 27B again at the time of changing the cantilever 2 and since the spot area is large, the laser spot is frequently lost in the vision system. Users which are not familiar to the device unnecessarily consumes a lot of time to position the laser spot on the top surface of the cantilever 2 to feel inconvenience for use.

SUMMARY

The present disclosure has been made in an effort to provide a head having improved usability by limiting a movement range of a laser spot and an atomic force microscope having the same.

An exemplary embodiment of the present disclosure provides a head measuring bending of a cantilever by using a laser beam reflected on the surface of the cantilever in order to acquire information on a sample surface by using a tip of the cantilever. The head includes: a spot moving means configured to move a laser spot so as to position the laser spot on the surface of the cantilever; and a movement limiting means configured to limit a movement range of the laser spot moved by the spot moving means in a predetermined range.

According to another feature of the present disclosure, the spot moving means may have a knob and a screw forming unit and move the laser spot by a linear motion of an end by rotation of the knob. The movement limiting means may limit the rotation of the knob to a predetermined range.

According to yet another feature of the present disclosure, the movement limiting means may be a projection which is projected on the outer periphery of the spot moving means, and a hook unit may be formed so as to hook the projection.

According to still another feature of the present disclosure, the movement limiting means may be attachable to the spot moving means, the movement limiting means may have the projection which is projected on the outer periphery thereof, and the hook unit may be formed so as to hook the projection.

According to still yet another feature of the present disclosure, the movement limiting means may limit a positionable area of the laser spot, and the movement limiting means may be mounted on the spot moving means so that a target point of the surface of a predetermined cantilever is positioned at the center of the positionable area of the laser spot.

Another exemplary embodiment of the present disclosure provides an atomic force microscope including a head having the above configuration.

According to exemplary embodiments of the present disclosure, a head and an atomic force microscope having the same can easily position a laser spot on the surface of a cantilever by limiting a movement range of the laser spot to a predetermined range to provide high usability and convenience.

The effects of the present disclosure are not limited to the aforementioned effects, and other effects, which are not mentioned above, will be apparent to a person having ordinary skill in the art from the following description.

The objects to be achieved by the present disclosure, the means for achieving the objects, and effects of the present disclosure described above do not specify essential features of the claims, and, thus, the scope of the claims is not limited to the disclosure of the present disclosure.

BRIEF DESCRIPTION OF THE DRAWINGS

The above and other aspects, features and other advantages of the present disclosure will be more clearly understood from the following detailed description taken in conjunction with the accompanying drawings, in which.

DETAILED DESCRIPTION OF THE PREFERRED EMBODIMENT

Figure 1:
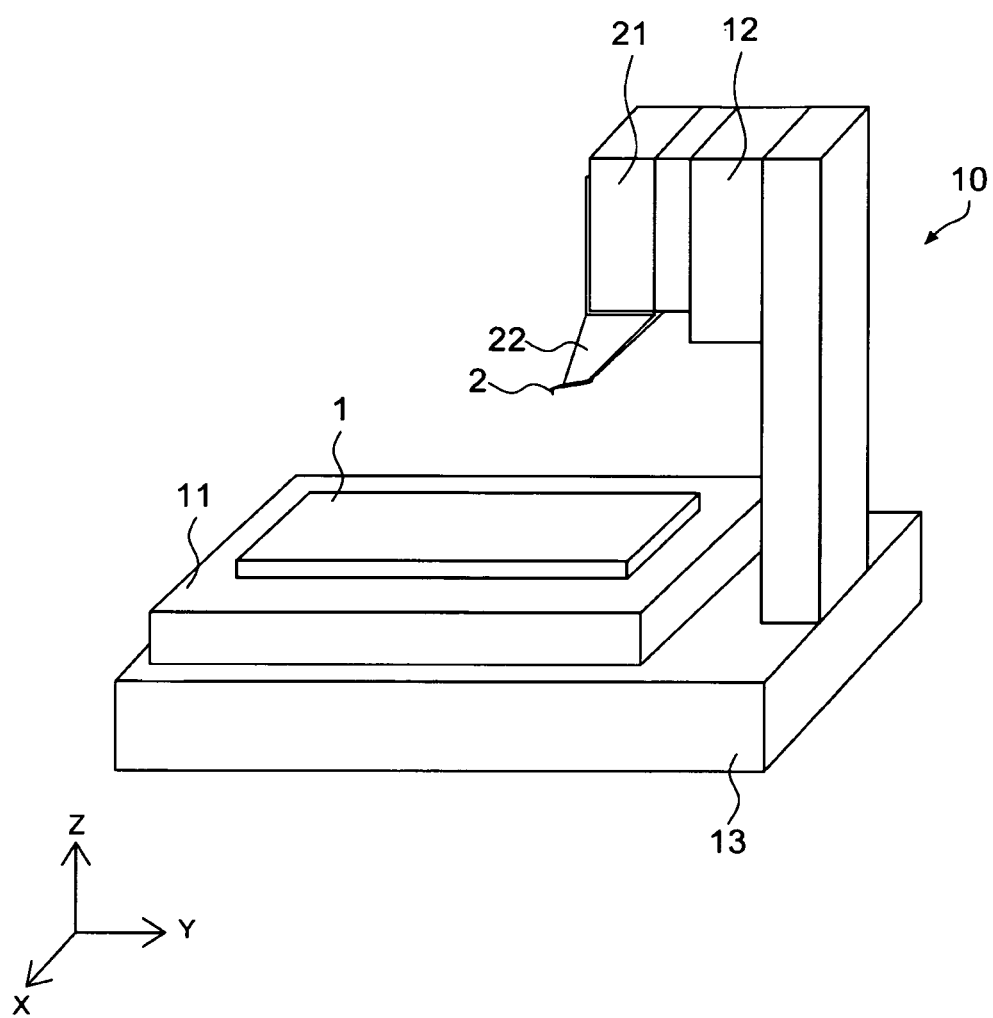
FIG. 1 is a schematic perspective view of an atomic force microscope in which an XY scanner and a Z scanner are separated in the related art.

The advantages and features of the present disclosure, and methods of accomplishing these will become obvious with reference to examples to be described below in detail along with the accompanying drawings. However, the present disclosure is not limited to the exemplary embodiments set forth below, and may be embodied in various other forms. The present exemplary embodiments are for rendering the description of the present disclosure complete and are set forth to provide a complete understanding of the scope of the disclosure to a person with ordinary skill in the technical field to which the present disclosure pertains, and the present disclosure will only be defined by the scope of the claims.

When an element or layer is referred to as being "on" another element or layer, it may be directly on the other element or layer, or intervening elements or layers may be present.

Although the terms "first", "second", and the like are used for describing various components, these components are not confined by these terms, of course. These terms are merely used for distinguishing one component from the other components. Therefore, a first component to be mentioned below may be a second component in a technical concept of the present disclosure, of course.

Throughout the whole specification, the same reference numerals denote the same elements.

Since size and thickness of each component illustrated in the drawings are represented for convenience in explanation, the present disclosure is not necessarily limited to the illustrated size and thickness of each component.

The features of various embodiments of the present disclosure can be partially or entirely bonded to or combined with each other and can be interlocked and operated in technically various ways as can be fully understood by a person having ordinary skill in the art, and the embodiments can be carried out independently of or in association with each other.

Hereinafter, a head and an atomic force microscope according to the present disclosure will be described with reference to the accompanying drawings.

Figure 3:
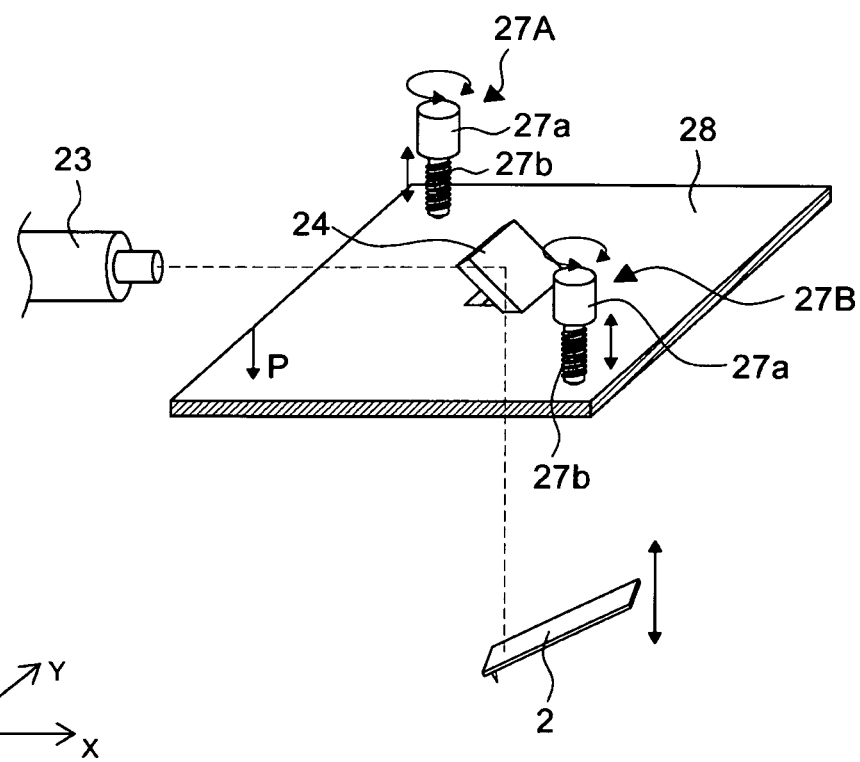
FIG. 3 is a conceptual diagram schematically illustrating a laser spot adjustment mechanism provided in the head of the general atomic force microscope.
Figure 4:
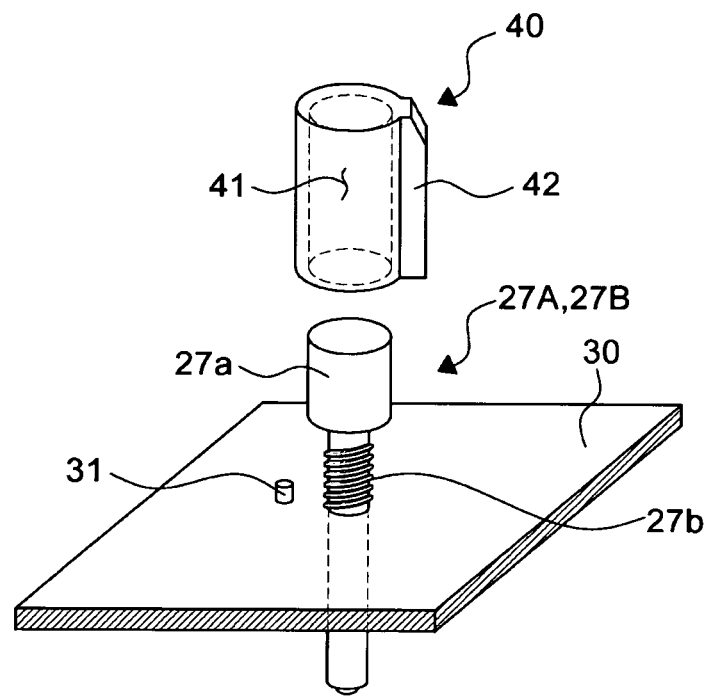
FIG. 4 is a schematic perspective view schematically illustrating a limiting means and a hook unit.
Figure 5:
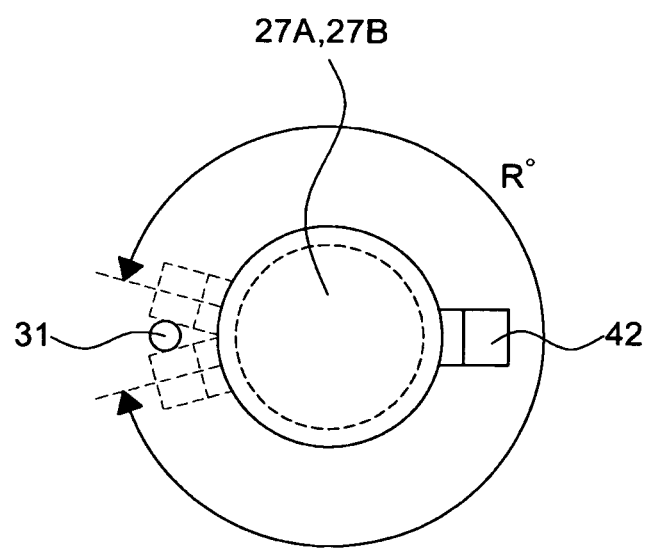
FIG. 5 is a schematic top view for describing operations of the limiting means and the hook unit of FIG. 4.

FIG. 3 is a conceptual diagram schematically illustrating a laser spot adjustment mechanism provided in the head of the general atomic force microscope. FIG. 4 is a schematic perspective view schematically illustrating a limiting means and a hook unit. FIG. 5 is a schematic top view for describing operations of the limiting means and the hook unit of FIG. 4.

Prior to detailed description, in regard to components illustrated in FIGS. 3 to 5, it should be noted that only components associated with components that serve to adjust a laser spot to be positioned on the top surface of a cantilever are illustrated among various components provided in the head of the atomic force microscope. Components (for example, a component that positions a laser beam reflected on the top surface of the cantilever at the center of a beam detecting device, a component of a Z scanner, and the like) other than the components illustrated in FIGS. 3 to 5 may follow a known constitution of the head of the atomic force microscope. For example, other components may follow the constitutions of FIGS. 1 and 2 or follow a constitution of a head of a completely different type atomic force microscope.

Referring to FIG. 3, a mirror 24 is positioned to be attached onto an intermediate body 28. Herein, an optical path may be formed by using a known prism instead of the mirror 24.

A laser beam generating unit 23 irradiates a laser beam (expressed by dotted lines) toward the mirror 24. The laser beam reflected on the mirror 24 is irradiated downward. The laser beam generating unit 23 is fixed so as not to be relatively displaceable from the intermediate body 28 and the mirror 24. That is, the laser beam generating unit 23 is not relatively movable with respect to the mirror 24.

Spot moving means 27A and 27B are provided to change the optical path of the laser beam reflected on the mirror 24 and irradiated downward. One corner portion of the intermediate body 28 is fixed to a housing (30 of FIGS. 2 and 4) of the head in such a way that it is rotatable (illustrated as part P in FIG. 3) and the spot moving means 27A and 27B are positioned to point-contact corner portions other therethan.

A spring (not illustrated) provides elastic force in a +Z direction to the intermediate body 28 in order to maintain a contact state of the intermediate body 28 and the spot moving means 27A and 27B. Each of the spot moving means 27A and 27B has a knob 27*a* and a screw forming unit 27*b* which become handles and the screw forming unit 27*b* is spirally coupled to the housing 30 of the head, and as a result, the spot moving means 27A and 27B may vertically move by rotating the knob 27*a*.

The spot moving means 27A vertically moves by the rotation to rotate the intermediate body 28 around an X axis, thereby causing the laser spot to move in a Y direction. Further, the spot moving means 27B vertically moves by the rotation to rotate the intermediate body 28 around a Y axis, thereby causing the laser spot to move in an X direction.

Figure 2:
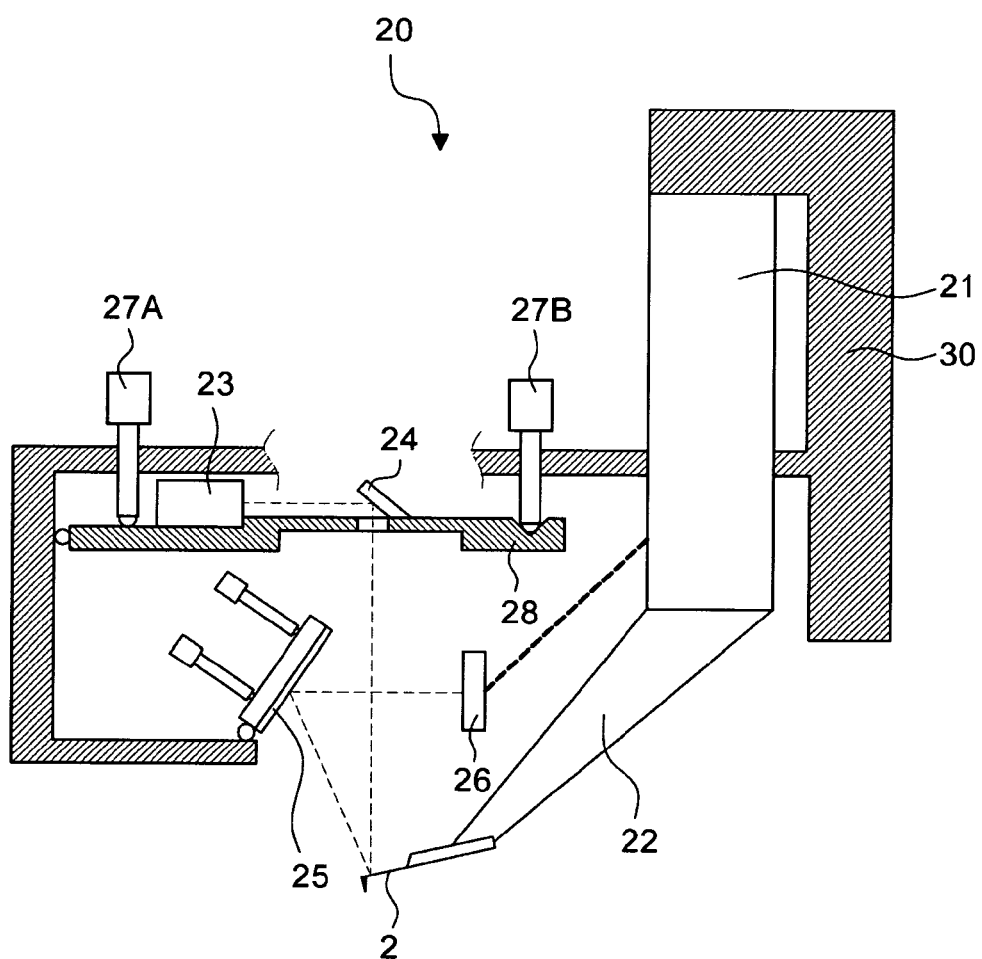
FIG. 2 is a schematic conceptual diagram of a head used in an atomic force microscope having a structure of FIG. 1.

Referring to FIGS. 4 and 5, a movement limiting means 40 further added to the head 20 having the constitutions of FIGS. 2 and 3 will be described in detail.

The movement limiting means 40 limits the spot moving means 27A and 27B so that the laser spot moves only within a predetermined range. The movement limiting means 40 has a hollow 41 so that the knob 27*a* fits the hollow 41 from the top of the knob 27*a*. The movement limiting means 40 is preferably detachable to the spot moving means 27A and 27B as illustrated in FIG. 4 and details will be described below.

Meanwhile, the hollow 41 is closed upward and opened downward in the exemplary embodiment, but is not limited thereto and may be formed to be opened even upward.

When the movement limiting means 40 fits in the knob 27*a* of the spot moving means 27A or 27B, the spot moving means 27A and 27B rotates by rotating the movement limiting means 40. That is, the movement limiting means 40 and the spot moving means 27A and 27B are fixed to each other. A fixing scheme may be variously set and for example, the movement limiting means 40 and the spot moving means 27A and 27B may be fixed to each other by engagement of a projection and a slit formed on an inner periphery of the movement limiting means 40 and an outer periphery of the knob 27*a*, respectively and a screw hole is formed to penetrate the side of the movement limiting means 40 and a set screw is inserted into the screw hole and fastened to fix the movement limiting means 40 and the knob 27*a*. Besides, the movement limiting means 40 and the knob 27*a* are mixed by various schemes.

A projection 42 is provided on an outer periphery of the movement limiting means 40. The projection 42 is a portion which is projected so as to have a rotary radius larger than a rotary radius of the outer periphery of the movement limiting means 40. The projection 42 is formed to be hooked by the hook unit 31 formed in the housing 30 of the head.

Referring to FIG. 5, rotation of the spot moving means 27A and 27B is limited by physical interference between the projection 42 and the hook unit 31. The spot moving means 27A and 27B may rotate at R° and R° may be adjusted based on a design by the width of the projection 42, the size of the hook unit 31, and the like. Meanwhile, unlike this, two or more hook units 31 are provided to limit the spot moving means 27A and 27B or the shape of the hook unit 31 is adjusted to limit the spot moving means 27A and 27B.

Since a pitch of the screw forming unit 27*b* of the spot moving means 27A or 27B is predetermined, when a desired R° is determined, a vertical movement width of the spot moving means 27A or 27B is determined. When the vertical movement width is determined, a distance at which the laser spot moves may also be determined by calculation. Since the distance at which the laser spot moves varies depending on various design criteria (that is, the distance may vary depending on a positional relationship between a fixing unit P and the spot moving means 27A or 27B, and the like), the distance may be appropriately selected.

Hereinafter, a method that installs the movement limiting means 40 in the spot moving means 27A and 27B will be described.

The movement limiting means 40 limits a positionable area of the laser spot and the movement limiting means 40 is preferably mounted on the spot moving means 27A and 27B so that a target point of the surface of the cantilever which is predetermined is positioned at the center of the positionable area of the laser spot.

First, the head 20 is mounted on a cantilever which becomes a reference (is predetermined) and thereafter, the laser spot is positioned on the top surface of the cantilever 2 by adjusting the spot moving means 27A and 27B. Herein, the cantilever which becomes the reference is preferably a cantilever which is frequently used.

Thereafter, as illustrated FIG. 5, the movement limiting means 40 is fixed to the spot moving means 27A and 27B so that the projection 42 of the movement limiting means 40 is positioned at an opposite location to the hook unit 31. That is, the projection 42 is configured to be positioned at the center of an area where the spot moving means 27A and 27B is rotatable. As a result, the laser spot may move only with a limited distance in the X direction and the Y direction around the target top surface of the cantilever.

When the cantilever which becomes the reference is changed or a movement area of the laser spot needs to be changed by a predetermined cause (for example, abrasion of a portion which contacts the spot moving means 27A or 27B, or the like) again, the above operation may be performed again.

When the movement limiting means 40 is mounted as described above, by limiting the movement range of laser spot, the location of the laser spot may be predicted with to some degree, and as a result, use convenience increases.

Further, the movement limiting means 40 is detachable to enable resetting depending on a situation. However, that that movement limiting means 40 is formed in the spot moving means 27A or 27B itself is not excluded should be noted. In this case, the movement limiting means 40 may be a projection which is projected on the outer periphery of the spot moving means 27A or 27B. That is, as illustrated in FIG. 4, the projection 42 is not formed in the movement limiting means 40 and the projection may be integrally formed on the surface of the knob 27*a*.

Meanwhile, when another cantilever completely different from the cantilever which becomes the reference is used, the movement limiting means 40 may be removed from the spot moving means 27A and 27B and the existing method may be used. That is, the movement limiting means 40 is detachable to cope with various situations, and as a result, usability of equipment increases.

Constitutions other than the above constitution may follow constitutions of heads and atomic force microscopes of XE Series, NX series, and the like of Park Systems Inc. which is an applicant of the present patent. However, the present disclosure is not limited thereto.

The exemplary embodiments of the present disclosure have been described above with reference to the accompanying drawings, but those skilled in the art will understand that the present disclosure may be implemented in another specific form without changing the technical spirit or an essential feature thereof. Therefore, the aforementioned exemplary embodiments are all illustrative and are not restricted to a limited form.

What is claimed is:

1. A head measuring bending of a cantilever by using a laser beam reflected on the surface of the cantilever in order to acquire information on a sample surface by using a tip of the cantilever, the head comprising:
- a spot moving means configured to move a laser spot so as to position the laser spot on the surface of the cantilever; and
- a movement limiting means configured to limit a movement range of the laser spot moved by the spot moving means in a predetermined range.

2. The head according to claim 1, wherein:
- the spot moving means has a knob and a screw forming unit and moves the laser spot by a linear motion of an end by rotation of the knob, and
- the movement limiting means limits the rotation of the knob to a predetermined range.

3. The head according to claim 2, wherein:
- the movement limiting means is a projection which is projected on the outer periphery of the spot moving means, and
- a hook unit is formed so as to hook the projection.

4. The head according to claim 2, wherein:
- the movement limiting means is attachable to the spot moving means,
- the movement limiting means has the projection which is projected on the outer periphery thereof, and
- the hook unit is formed so as to hook the projection.

5. The head according to claim 4, wherein:
- the movement limiting means limits a positionable area of the laser spot, and
- the movement limiting means is mounted on the spot moving means so that a target point of the surface of a predetermined cantilever is positioned at the center of the positionable area of the laser spot.

6. An atomic force microscope, comprising
a head measuring bending of a cantilever by using a laser beam reflected on the surface of the cantilever in order to acquire information on a sample surface by using a tip of the cantilever,
the head further comprising:
- a spot moving means configured to move a laser spot so as to position the laser spot on the surface of the cantilever; and
- a movement limiting means configured to limit a movement range of the laser spot moved by the spot moving means in a predetermined range.

7. The atomic force microscope according to claim 6, wherein:
- the spot moving means has a knob and a screw forming unit and moves the laser spot by a linear motion of an end by rotation of the knob, and
- the movement limiting means limits the rotation of the knob to a predetermined range.

8. The atomic force microscope according to claim 7, wherein:
- the movement limiting means is a projection which is projected on the outer periphery of the spot moving means, and
- a hook unit is formed so as to hook the projection.

9. The atomic force microscope according to claim 7, wherein:
- the movement limiting means is attachable to the spot moving means,
- the movement limiting means has the projection which is projected on the outer periphery thereof, and
- the hook unit is formed so as to hook the projection.

10. The atomic force microscope according to claim 9, wherein:
- the movement limiting means limits a positionable area of the laser spot, and
- the movement limiting means is mounted on the spot moving means so that a target point of the surface of a predetermined cantilever is positioned at the center of the positionable area of the laser spot.

* * * * *